United States Patent
Kinoshita et al.

(10) Patent No.: US 8,426,499 B2
(45) Date of Patent: Apr. 23, 2013

(54) OFFSET PRINTING INK

(75) Inventors: Hiroshi Kinoshita, Chiba (JP); Narihito Sekiguchi, Saitama (JP); Yukie Suwa, Sakura (JP); Fumihiko Maekawa, Sakura (JP); Kosaku Nishiyama, Kawagoe (JP)

(73) Assignee: DIC Corporation, Tokyo (JP)

( * ) Notice: Subject to any disclaimer, the term of this patent is extended or adjusted under 35 U.S.C. 154(b) by 128 days.

(21) Appl. No.: 12/736,271

(22) PCT Filed: Mar. 23, 2009

(86) PCT No.: PCT/JP2009/055583
§ 371 (c)(1),
(2), (4) Date: Sep. 24, 2010

(87) PCT Pub. No.: WO2009/119472
PCT Pub. Date: Oct. 1, 2009

(65) Prior Publication Data
US 2011/0015339 A1  Jan. 20, 2011

(30) Foreign Application Priority Data
Mar. 28, 2008 (JP) ................................ 2008-086289

(51) Int. Cl.
*C09D 11/10* (2006.01)
(52) U.S. Cl.
USPC ............ 523/200; 523/160; 524/556; 524/611
(58) Field of Classification Search .................. 524/556, 524/611; 523/160, 200
See application file for complete search history.

(56) References Cited

U.S. PATENT DOCUMENTS 5,543,219 A * 8/1996 Elwakil ................. 428/402.24
6,037,405 A * 3/2000 Iwase et al. .................. 524/596

FOREIGN PATENT DOCUMENTS

| JP | 64-40566 A | 2/1989 |
| JP | 06-016986 A | 1/1994 |
| JP | 06-016987 A | 1/1994 |
| JP | 11-323238 A | 11/1999 |
| JP | 2004-002501 A | 1/2004 |
| JP | 2007-002242 A | 1/2007 |

OTHER PUBLICATIONS

International Search Report dated Jun. 9, 2009, issued in PCT/JP2009/055583.

* cited by examiner

*Primary Examiner* — Vu A Nguyen
(74) *Attorney, Agent, or Firm* — Edwards Wildman Palmer LLP; James E. Armstrong, IV; Nicholas J. DiCeglie, Jr.

(57) ABSTRACT

An offset printing ink in which a modified pigment (D) is dispersed in a vehicle as a colorant, the modified pigment (D) contains a polymer (P) on the surface thereof, and the polymer (P) is obtained by polymerizing a resin or fat (B) which has a polymerizable unsaturated group, and is soluble in a nonaqueous solvent, and at least one of polymerizable unsaturated monomers (C) which are soluble in a nonaqueous solvent and insoluble or poorly-soluble after polymerization, and specifically, the resin or fat (B) is selected from the group consisting of acrylic resins having a polymerizable unsaturated group, alkyd resins which are soluble in the nonaqueous solvent, natural resin-modified phenol resins, and fats.

15 Claims, No Drawings

OFFSET PRINTING INK

FIELD OF THE INVENTION

The present invention relates to an offset printing ink which can reduce the time for dispersing a pigment during ink production, and has excellent gloss and color optical density.

BACKGROUND OF THE INVENTION

A large variety of pigment compositions are known. For example, Patent Document No. 1 discloses a pigment composition containing 100 parts of an organic pigment and 1 to 15 parts of an aliphatic dicarboxylic acid having 1 to 8 carbon atoms. Patent Document No. 2 discloses a pigment composition containing 100 parts of an organic pigment and 1 to 15 parts of an aliphatic acid having 6 to 21 carbon atoms. In addition, a pigment composition which contains a self-condensate of an aliphatic acid having a hydroxyl group and an organic pigment is also well known. However, when a pigment dispersion used for an ink or a coating, is produced using such pigment compositions, there is a defect in that the fluidity and gloss are insufficient.

Patent Document No. 3 discloses a pigment composition containing an organic pigment and an ester compound produced by an aliphatic acid having a hydroxyl group and an aliphatic acid. The affinity to a dispersion medium is improved by converting a carboxylic acid into a compound having an ester bond. Thereby, not only can the ink fluidity be improved, but the gloss can also be improved, and a flushing time during ink production can also be reduced.

Patent Document No. 1: Japanese Unexamined Patent Application, First Publication No. H6-16986
Patent Document No. 2: Japanese Unexamined Patent Application, First Publication No. H6-16987
Patent Document No. 3: Japanese Unexamined Patent Application, First Publication No. H11-323238

DESCRIPTION OF THE INVENTION

Problem to be Solved by the Invention

The problem to be solved by the present invention is to provide an offset printing ink which has excellent affinity to a dispersion medium, and can reduce the time required to disperse a pigment during ink production, and further has excellent gloss and color optical density.

Means for Solving the Problem

The inventors of the present invention have found that a modified pigment has excellent pigment dispersibility in a liquid resin vehicle; the modified pigment is characterized by containing a polymer on the surface thereof; and the polymer is produced by polymerizing a polymer having a polymerizable unsaturated group which is soluble in a nonaqueous solvent, and at least one of polymerizable unsaturated monomers which is soluble in a nonaqueous solvent and is insoluble or poorly-soluble after polymerization. Thereby, the inventors realized the present invention.

The present invention provides an offset printing ink in which a modified pigment (D) is dispersed, the modified pigment (D) contains a polymer (P) which is obtained by polymerizing a resin or a fat (B) which has a polymerizable unsaturated group and is soluble in a nonaqueous solvent, and at least one of polymerizable unsaturated monomers (C) which are soluble in a nonaqueous solvent and insoluble or poorly-soluble after polymerization, on the surface of a pigment (A).

Effect of the Invention

According to the present invention, an offset printing ink can be produced which has excellent affinity to a dispersion medium. The time required for dispersing a pigment during ink production can be reduced and excellent gloss and color optical density characteristics can be achieved.

BEST MODE OF CARRYING OUT THE INVENTION (Modified Pigment (D))

The modified pigment (D) which is used as a colorant in the present invention can be obtained by polymerizing at least one of polymerizable unsaturated monomers (C) which are soluble in a nonaqueous solvent and insoluble or poorly-soluble after polymerization, in the presence of a conventional pigment (A), a nonaqueous solvent, and a resin or a fat (B) which has a polymerizable unsaturated group, and is soluble in a nonaqueous solvent. That is, the modified pigment (D) can be produced by so-called "in-situ polymerization".

In the past, an in-situ polymerization method required a polymerization field in which a pigment was finely and stably dispersed in a dispersion stabilizer. In the present invention, an interface (between the pigment (A) and a resin or a fat (B)) which is formed by making the surface of the pigment (A) wet by the resin or the fat (B) is considered to be a polymerization field. Therefore, a reaction field in which a pigment is finely and stably dispersed in a dispersion stabilizer is not always necessary in the present invention. Due to this, various kinds of pigments can be used in the present invention.

(Pigment (A))

The pigment (A) used in the present invention is at least one pigment selected from well-known and commonly-used organic pigments and inorganic pigments. In addition, the present invention can use both non-treated pigments and treated pigments.

Examples of the organic pigment include, for example, perylene.perinon-based compound pigments, quinacridone-based compound pigments, phthalocyanine-based compound pigments, anthraquinone-based compound pigments, phthalon-based compound pigments, dioxazine-based compound pigments, isoindolinone-based compound pigments, methine.azomethine-based compound pigments, diketopyrrolopyrrole-based compound pigments, insoluble azo-based compound pigments, and condensed azo-based compound pigments. Specific examples of the organic pigments include the following pigments.

Examples of the perylene.perinon-based compound pigments include, for example, C. I. Pigment Violet 29; C. I. Pigment Red 123, 149, 178, and 179; C. I. Pigment Black 31, and 32; and C. I. Pigment Orange 43.

Examples of the quinacridone-based compound pigments include, for example, C. I. Pigment Violet 19, and 42; C. I. Pigment Red 122, 202, 206, 207, and 209; and C. I. Pigment Orange 48 and 49.

Examples of the phthalocyanine-based compound pigments include, for example, C. I. Pigment Blue 15, 15:1, 15:2, 15:3, 15:4, 15:6, and 16; and C. I. Pigment Green 7 and 36.

Examples of the anthraquinone-based compound pigments include, for example, C. I. Pigment Blue 60; C. I. Pigment Yellow 24, and 108; C. I. Pigment Red 168, and 177; and C. I. Pigment Orange 40.

Examples of the phthalon-based compound pigments include, for example, C. I. Pigment Yellow 138.

Examples of the dioxazine-based compound pigments include, for example, C. I. Pigment Violet 23 and 37.

Examples of the isoindolinone-based compound pigments include, for example, C. I. Pigment Yellow 109, 110, and 173; and C. I. Pigment Orange 61.

Examples of the methine.azomethine-based compound pigments include, for example, C. I. Pigment Yellow 139, and 185; C. I. Pigment Orange 66; and C. I. Pigment Brown 38.

Examples of the diketopyrrolopyrrole-based compound pigments include, for example, C. I. Pigment Red 254, and 255.

Examples of the insoluble azo-based compound pigments include, for example, C. I. Pigment Yellow 1, 3, 12, 13, 14, 17, 55, 73, 74, 81, 83, 97, 130, 151, 152, 154, 156, 165, 166, 167, 170, 171, 172, 174, 175, 176, 180, 181, and 188; C. I. Pigment Orange 16, 36, and 60; C. I. Pigment Red 5, 22, 31, 112, 146, 150, 171, 175, 176, 183, 185, 208, and 213; C. I. Pigment Violet 43, and 44; C. I. Pigment Blue 25 and 26.

Examples of the condensed azo-based compound pigments include, for example, C. I. Pigment Yellow 93, 94, 95, 128, and 166; C. I. Pigment Orange 31; C. I. Pigment Red 144, 166, 214, 220, 221, 242, 248, and 262; and C. I. Pigment Brown 41, and 42.

Examples of the inorganic pigments include, for example, titanium oxide, zinc sulfide, white lead, zinc oxide, lithopone, antimony trixode, basic lead sulfate, basic lead silicate, barium sulfate, calcium carbonate, gypsum, silica, carbon black, black iron oxide, cobalt violet, vermilion, molybdenum orange, minium, bengala, chrome yellow, cadmium yellow, zinc chromate, yellow ocher, chromium oxide, ultramarine blue, Prussian blue, and cobalt blue.

In the present invention, organic pigments are preferably used. Such organic pigments are preferable in that they provide efficient effects. In particular, a quinacridone-based compound pigment, a phthalocyanine-based compound pigment, a insoluble azo-based compound pigment, and a condensed azo-based compound pigment are preferably used.

(Nonaqueous Solvent)

The nonaqueous solvent used in the present invention is an organic solvent which essentially contains an aliphatic hydrocarbon-based solvent and/or an alicyclic hydrocarbon-based solvent. Examples of the aliphatic hydrocarbon-based solvent and the alicyclic hydrocarbon-based solvent include, for example, n-hexane, n-heptane, "Laws" and "Mineral Sprits EC" marketed by Shell Chemical, "Isopar C", "Isopar E", "Isopar G", "Isopar H", "Isopar L", "Isopar M", "Naphtha No. 3", "Naphtha No. 5", and "Naphtha No. 6", marketed by Exxon Mobil Chemical, "Solvent No. 7", "IP Solvent 1016", "IP Solvent 1620", "IP Solvent 2028", and "IP Solvent 2835", marketed by Idemitsu Kosan Co., Ltd., "Whitezol" marketed by Japan Energy Corporation, "Marukazol 8" marketed by Maruzen Petrochemical Corporation, and "AF Solvent No. 4", "AF Solvent No. 5", "AF Solvent No. 6", and "AF Solvent No. 7" marketed by Nippon Oil Corporation.

Other organic solvents may be mixed and used as long as the organic solvent is not detrimental to the effects of the present invention. Examples of other organic solvents include, for example, aromatic hydrocarbon-based solvents such as "Swasol 100" and"Swasol 150" marketed by Maruzen Petrochemical Co., Ltd., toluene, and xylene; ester-based solvents, such as methyl acetate, ethyl acetate, n-butyl acetate, and amyl acetate; ketone-based solvents such as acetone, methyl ethyl ketone, methyl isobutyl ketone, methyl amyl ketone, and cyclohexanone; and alcohol-based solvents such as methanol, ethanol, n-propanol, i-propanol, and n-buthanol.

When other solvents are mixed and used together with the aliphatic hydrocarbon-based solvent and/or the alicyclic hydrocarbon-based solvent, the amount of the aliphatic hydrocarbon-based solvent and/or the alicyclic hydrocarbon-based solvent is preferably 50% by mass or more, and more preferably 60% by mass or more.

(Resin or Fat (B) which has a Polymerizable Unsaturated Group, and is Soluble in a Nonaqueous Solvent)

The resin or fat (B), which has a polymerizable unsaturated group, and is soluble in a nonaqueous solvent, is not particularly limited, as long as it has a polymerizable unsaturated group, and is soluble in a nonaqueous solvent. In the present invention, the term polymerizable unsaturated group means an unsaturated group having polymerizability, such as radical polymerizability, anionic polymerizability, cationic polymerizability, and oxidation polymerizability. Among these, a polymerizable unsaturated group is preferably a radical polymerizable unsaturated group or an oxidation polymerizable unsaturated group, from the viewpoint of reactivity during in-situ polymerization. In addition, the oxidation polymerization unsaturated group is also preferable, because it improves ink-drying properties.

Specific examples of the resin or fat (B) which has a polymerizable unsaturated bond, and is soluble in a nonaqueous solvent include, for example, acrylic resins having a polymerizable unsaturated group (hereinafter called "acrylic resin (B-1)"), alkyd resins which are soluble in a nonaqueous solvent, natural resin-modified phenol resins (hereinafter called "natural resin-modified phenol resin (B-4)"), and fats (hereinafter called "fat (B-5)").

(Acrylic Resin (B-1) Having a Polymerizable Unsaturated Group)

Specifically, acrylic resin (B-1) having a polymerizable unsaturated group denotes a polymer in which a polymerizable unsaturated group is introduced in a copolymer including polymerizable unsaturated monomers containing mainly alkyl(meth)acrylate having an alkyl group containing 4 or more carbon atoms; or a macromonomer including a copolymer made of polymerizable unsaturated monomers containing mainly alkyl(meth)acrylate having an alkyl group containing 4 or more carbon atoms.

Examples of the alkyl(meth)acrylate having an alkyl group containing 4 or more carbon atoms include, for example, n-butyl(meth)acrylate, i-butyl(meth)acrylate, t-butyl(meth)acrylate, 2-ethylhexyl(meth)acrylate, lauryl(meth)acrylate, stearyl(meth)acrylate, isostearyl(meth)acrylate, and cyclohexyl(meth)acrylate.

In addition, examples of polymerizable unsaturated monomers which can be used in the present invention in addition to the alkyl(meth)acrylate include, for example, aromatic vinyl-based monomers such as styrene, α-methyl styrene, p-t-butyl styrene, and vinyl toluene; (meth)acrylates such as benzyl (meth)acrylate, dimethyl amino(meth)acrylate, diethylamino (meth)acrylate, dibromopropyl(meth)acrylate, and tribromophenyl(meth)acrylate; diesters of monohydric alcohol and unsaturated dicarboxylic acid such as maleic acid, fumaric acid, and itaconic acid; and vinyl esters such as vinyl benzoate, and "VEOVA®" (vinyl ester marketed by Royal Dutch Shell). These polymerizable unsaturated monomers can be used by copolymerizing the alkyl(meth)acrylate.

Polymer singly made of a polymerizable unsaturated monomer other than the alkyl(meth)acrylate has low solubility to the nonaqueous solvent. Therefore, the polymerizable unsaturated monomer other than the alkyl(meth)acrylate is preferably used as a random polymer containing the polymerizable unsaturated monomer and alkyl(meth)acrylate. When the polymerizable unsaturated monomer is copolymerized so as to be a block copolymer or a graft copolymer, the copolymer remarkably reduces their solubility, and it is not preferable.

These polymerizable unsaturated monomers may be used alone or in combination. Among these, a linear or branched alkyl(meth)acrylate having 4 to 12 carbon atoms, such as n-butyl(meth)acrylate, 2-ethylhexyl(meth)acrylate, lauryl methacrylate, is particularly preferable.

The copolymer including polymerizable unsaturated monomers containing mainly alkyl(meth)acrylate having an alkyl group containing 4 or more carbon atoms can be obtained by polymerizing the polymerizable unsaturated monomers by a common method.

The acrylic resin (B-1) having a polymerizable unsaturated group is obtained by introducing the polymerizable unsaturated group into the copolymer made of the polymerizable unsaturated monomers containing mainly alkyl(meth)acrylate having an alkyl group containing 4 or more carbon atoms.

Examples of the method for introducing the polymerizable unsaturated group include, for example: the following methods.

A method, in which, beforehand, a polymerizable monomers having a carboxyl group such as acrylic acid and methacrylic acid and a polymerizable monomers having an amino group such as dimethyl amino ethyl methacrylate and dimethyl aminopropyl acrylamide are mixed as the monomer to copolymerize to obtain the copolymer having a carboxyl group and an amino group; and the carboxyl group, the amino group, a glycidyl group of glycidyl methacrylate or the like, and the polymerizable unsaturated group of the polymerizable unsaturated monomer are reacted.

A method, in which, beforehand, monomers having a hydroxyl group such as 2-hydroxyethyl methacrylate, and 2-hydroxyethyl acrylate are mixed as the monomer to copolymerize to obtain a copolymer having a hydroxyl group. The hydroxyl group, an isocyanate group of isocyanate ethyl methacrylate or the like, and the polymerizable unsaturated group of the monomer are then reacted together.

A method, in which a carboxyl group is introduced into an end of a copolymer using thioglycolic acid as a chain transfer during polymerization; and the carboxyl group, a glycidyl group of glycidyl methacrylate or the like, and the polymerizable unsaturated group of the monomer are reacted.

A method, in which a carboxyl group is introduced into a copolymer using an azo polymerization initiator having a carboxyl group, such as azobiscyanopentanic acid; and the carboxyl group, a glycidyl group of glycidyl methacrylate or the like, and the polymerizable unsaturated group of the monomer are reacted.

Among these methods, the method is the simplest and preferable, in which the monomers having a carboxyl group such as acrylic acid and methacrylic acid or the monomers having an amino group such as dimethyl amino ethyl methacrylate and dimethyl aminopropyl acrylamide are mixed to copolymerize; and the carboxyl group or the amino group, a glycidyl group of glycidyl methacrylate or the like, and the polymerizable unsaturated group of the monomer are reacted.

Alkyd Resin which is Soluble in the Nonaqueous Solvent

Alkyd resin which is soluble in the nonaqueous solvent is a modified resin obtained by modifying a condensed product between polybasic acid and polyhydric alcohol with a fatty oil or a fatty acid. Vinyl-modified condensed products, phenol-modified condensed products, epoxy ester-modified condensed products, and silicon-modified condensed product are also well known. In the present invention, from the viewpoint of high solubility in the nonaqueous solvent, alkyd resin containing a large amount of an oil component is preferably used, that is, a long oil alkyd resin is preferably used. In addition, from the viewpoint of reactivity during polymerization with the after-mentioned polymerizable unsaturated monomer (C), acryl-modified alkyd resin is also preferably used. Below, a long oil alkyd resin, and acryl-modified alkyd resin are abbreviated as alkyd resin (B-2), and acryl-modified alkyd resin (B-3), respectively.

The alkyd resin (B-2) used in the present invention is preferably an alkyd resin containing a large amount of a oil, and more preferably a long oil alkyd resin.

The alkyd resin (B-2) used in the present invention may be an alkyd resin which is obtained by reacting at least one of the following polyhydric alcohols and at least one of the following carboxylic acids using at least one of the following oils or fatty acids. In addition, the alkyd resin (B-2) may be an alkyd resin which is obtained by reacting a polyhydric alcohol and a carboxylic acid, a part of the polyhydric alcohol and the carboxylic acid is replaced with the following reactive silicone resin, monoepoxy compound, polyepoxy compound, diisocyanate, polyisocyanate, or polyisocyanate having an isocyanul ring obtained by (co)polymerizing the diisocyanates, using at least one of the following oils or fatty acids.

Examples of the oils or fatty acids include, for example, saturated fatty acids such as octylic acid, lauric acid, stealic acid, and "Versatic acids" (synthesized fatty acid, marketed by Shell corporation); unsaturated fatty acids such as oleic acid, linoleic acid, linoleinic acid, eleostearic acid, and ricinoleic acid; (semi) drying oils (fatty acids) such as "Pamoline 200" and "Pamoline 300" (synthesized drying oil fatty acid), tung oil (fatty acid), linseed oil (fatty acid), dehydrated castor oil (fatty acid), tall oil (fatty acid), cottonseed cake oil (fatty acid), soybean oil (fatty acid), olive oil (fatty acid), safflower oil (fatty acid), castor oil (fatty acid), and rice bran oil (fatty acid); non-drying oils (fatty acids) such as hydrogenated coconut oil fatty acid, coconut oil fatty acid, and palm oil fatty acid.

Examples of the polyhydric alcohol include, for example, ethylene glycol, propylene glycol, glycerin, trimethylolethane, trimethylolpropane, neopentyl glycol, 1,6-hexanediol, 1,2,6-hexanetriol, pentaerythritol, and sorbitol.

Examples of the carboxylic acid include, for example, benzoic acid, p-tert-butyl benzoic acid, phthalic acid (anhydrous), hexahydro(anhydrous)phthalic acid, tetrahydro(anhydrous)phthalic acid, tetrachloro(anhydrous)phthalic acid, hexachloro(anhydrous)phthalic acid, tetrabromo(anhydrous)phthalic acid, trimellitic acid, "Himic acid" (marketed by Hitachi Chemical Co., Ltd.), (anhydrous)succinic acid, (anhydrous)maleic acid, fumaric acid, (anhydrous)itaconic acid, adipic acid, sebacic acid, and oxalic acid.

Examples of the reactive silicone resin include, for example, "Toray Silicone SH-6018" (marketed by Toray Silicone Co., Ltd.), and "X-22-160S", KR-212", and "KR-213" (marketed by Shin-Etsu Chemical Co., Ltd.).

Examples of the monoepoxy compound include, for example, glycidyl esters of fatty acids, such as "Cardura E" (glycidyl ester of the aforementioned "Versatic acids", marketed by Shell Chemicals).

Examples of the polyepoxy compounds include, for example, "EPICLON® 200", "EPICLON® 400" (marketed by DIC Corporation), "EPICOAT® 828", and "EPICOAT® 1001" (marketed by Yuka Shell Epoxy Co., Ltd.).

Examples of the diisocyanate include, for example, tolylene diisocyanate, hexamethylene diisocyanate, isophoron diisocyanate, and 4,4-methylene bis(cyclohexylisocyanate).

(Acryl-Modified Alkyd Resin (B-3))

The acryl-modified alkyd resin (B-3) used in the present invention denotes products which are obtained by polymerizing polymerizable unsaturated monomers in the presence of the alkyd resin (B-2) or products which are obtained by grafting an acryl polymer into an alkyd resin by an addition reaction, or the like. The polymerizable unsaturated monomer is preferably alkyl(meth)acrylate having 4 or more carbon atoms. Examples of the alkyl(meth)acrylate having 4 or more carbon atoms include, for example, n-butyl(meth)acrylate, i-butyl(meth)acrylate, t-butyl(meth)acrylate, 2-ethylhexyl (meth)acrylate, lauryl(meth)acrylate, stearyl(meth)acrylate, isostearyl(meth)acrylate, and cyclohexyl(meth)acrylate. These alkyl(meth)acrylate are particularly preferable, because of having high solubility to the nonaqueous solvent. These polymerizable unsaturated monomers can be used alone or in combination. Among these, linear or branched alkyl(meth)acrylates having 4 to 12 carbon atoms, such as n-butyl(meth)acrylate, 2-ethyhexyl(meth)acrylate, and lauryl(meth)acrylate are particularly preferable.

As long as the solubility of the acryl-modified alkyd resin (B-3) to the nonaqueous solvent is not decreased, aromatic vinyl monomers such as styrene, α-methyl styrene, p-t-butyl styrene, vinyl toluene; (meth)acrylates such as benzyl(meth) acrylate, dimethyl amino(meth)acrylate, diethylamino(meth) acrylate, dibromopropyl(meth)acrylate, and tribromophenyl (meth)acrylate; diesters between monoalcohol and unsaturated dicarboxylic acids such as maleic acid, fumaric acid, and itaconic acid; or vinyl esters such as vinyl benzoate, and "VEOVA®" (vinyl ester marketed by Royal Dutch Shell) can be polymerized together with the alkyl(meth)acrylate.

The acryl resin which is grafted to the alkyd resin is preferably a polymer of the polymerizable unsaturated monomers mainly containing alkyl(meth)acrylate having an alkyl group having 4 or more carbon atoms, from the viewpoint of high solubility to the nonaqueous solution.

(Natural Resin-Modified Phenol Resin (B-4))

The natural resin-modified phenol resin (B-4) used in the present invention is a product containing essentially natural resins, condensed products between phenol and formaldehyde, and polyhydric alcohols.

Examples of the natural resin include, for example, danmar, wood rosin, gum rosin, tall oil rosin, copal gum, barzam, sandarac, yacca gum, seed lac, purified shellac, decolorized shellac, and white shellac. Among these, rosins such as wood rosin, gum rosin, and tall oil rosin are preferable.

Any condensed product between the phenol and formaldehyde can be used without limitation. Examples of the condensed product include, for example, condensed products of phenols and formaldehyde in the presence of an alkali catalyst, for example, metal hydroxides, metal oxides, organic salts of sodium, potassium, calcium, magnesium, zinc, and the like, ammonium aqueous solution, and organic amine compounds, and novolac type phenol resin substituted with a resol.

Examples of the phenol include, for example, phenol, cresol, amino phenol, p-t-butyl phenol, p-octyl phenol, p-nonyl phenol, p-dodecyl phenol, and bisphenol A. Among these, alkyl phenols having a substitution group having 4 to 12 carbon atoms at a para position such as p-t-butyl phenol, p-octyl phenol, p-nonyl phenol, and p-dodecyl phenol.

Examples of the formaldehyde include, for example, formalin, and paraformaldehyde.

Examples of the polyhydric alcohol include, for example, glycerin, diglycerin, trimethylol ethane, trimethylol propane, ethylene glycol, diethylene glycol, triethylene glycol, propylene glycol, neopentyl glycol, trimethylol propane, pentaerythritol, dipentaerythritol, and sorbitol. Among these, glycerin, and pentaerythritol are preferable.

When the natural resin-modified phenol resin (B-4) is synthesized, other reaction components such as animal/plant oil, animal/plant oil fatty acid, or petroleum resin can be used. Examples of the animal/plant oil include, for example, coconut oil, palm oil, canola oil, soybean oil, hydrogenated soybean oil, linseed oil, tung oil, beef fat, and fish oil.

Examples of the animal/plant fatty acid include, for example, caproic acid, caprylic acid, cabminic acid, isooctanic acid, isononanic acid, lauric acid, myristic acid, palmitic acid, palmitoleic acid, stearic acid, isostearic acid, oleic acid, linoleic acid, linoleic acid, eleostearic acid, arachidic acid, arachidonic acid, behenic acid, and erucic acid.

Examples of the petroleum resin include, for example, DCPD-based petroleum resin obtained by using dicyclopentadiene (DCPD)-based raw materials such as cyclopentadiene, and dicyclopentadiene; C5-based petroleum resins obtained by using C5-based raw materials such as pentene, cyclopentene, pentadiene, and isoprene; C9-based petroleum resins obtained by using C9-based raw materials such as methyl butane, indene, methyl indene, vinyl toluene, styrene, α-methyl styrene, and β-methyl styrene; copolymerized petroleum resin between the DCPD-based raw materials and the C5-based raw materials; copolymerized petroleum resin between the DCPD-based raw materials and the C9-based raw materials; copolymerized petroleum resin between the C5-based raw materials and the C9-based raw materials; and copolymerized petroleum resin between the DCPD-based raw materials, the C5-based raw materials and the C9-based raw materials.

Examples of the natural resin-modified phenol resin (B-4) include, for example, "Beckasite F-5501", "Beckasite F-5503", "Beckasite F-7301", "Beckasite F-7304", and "Beckasite F-180" marketed by DIC Corporation.

(Fat (B-5))

Any fat can be used as fat and oil (B-5) in the present invention without limitations. However, fat which is liquid at room temperature is preferable, because it is easily handled.

Examples of the fat (B-5) include, for example, coconut oil, palm kernel oil, palm oil, linseed oil, olive oil, oleic safflower oil, wood oil, poppy seed oil, rice bran oil, corn oil, sesame oil, safflower oil, soybean oil, tea oil, tall oil, rapeseed oil, castor oil, dehydrogenated castor oil, sunflower seed oil, cottonseed cake oil, and peanut oil.

Among these, a fat having 100 or more iodine value is preferable. In particular, linseed oil, soybean oil, and safflower oil are preferable. These fats can be used alone or in combination.

(Polymerizable Unsaturated Monomer (C) which is Soluble in a Nonaqueous Solvent and is Insoluble or Poorly-Soluble After Polymerization)

Examples of the polymerizable unsaturated monomers (C), which are soluble in a nonaqueous solvent and is insoluble or poorly-soluble after polymerization, used in the present invention, include, for example, vinyl monomers which do not have a so-called reactive polar group (functional group), such as methyl(meth)acrylate, ethyl(meth)acrylate, n-propyl(meth)acrylate and i-propyl methacrylate, and olefins such as (meth)acrylonitrile, vinyl acetate, vinyl chloride, vinylidene chloride, vinyl fluoride or vinylidene fluoride;

amide bond-containing vinyl monomers such as (meth)acrylamide, dimethyl(meth)acrylamide, N-t-butyl(meth)acrylamide, N-octyl(meth)acrylamide, diacetone acrylamide, dimethyl aminopropyl acrylamide and alkoxylated N-methylolated(meth)acrylamides;

dialkyl[(meth)acryloyloxyalkyl]phosphates, (meth)acryloyloxyalkyl acid phosphates, dialkyl[(meth)acryloyloxyalkyl]phosphites and (meth)acryloyloxyalkyl acid phosphites;

phosphorus atom-containing vinyl monomers such as 3-chloro-2-acid phosphoxypropyl(meth)acrylate, alkylene oxide addition products of the aforementioned (meth)acryloyloxy alkyl acid phosphates or acid phosphites, and ester compounds of epoxy group-containing vinyl monomers such as glycidyl(meth)acrylate and methylglycidyl(meth)acrylate, and phosphoric acid, phosphorus acid or acidic esters thereof;

hydroxyl group-containing polymerizable unsaturated monomers, for example, hydroxyalkyl esters of polymerizable unsaturated carboxylic acids or their addition products with ε-caprolactone, such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate, 4-hydroxybutyl(meth)acrylate, 3-chloro-2-hydroxypropyl(meth)acrylate, di-2-hydroxyethyl fumarate or mono-2-hydroxyethyl monobutyl fumarate, or polypropylene glycol or polyethylene glycol mono(meth)acrylate, or "PLACCEL FM or FA Monomer" (caprolactone addition monomer marketed by Daicel Chemical Industries, Ltd.), unsaturated monocarboxylic acids and/or dicarboxylic acids, such as (meth)acrylic acid, crotonic acid, maleic acid, fumaric acid, itaconic acid or citraconic acid, polymerizable unsaturated carboxylic acids such as monoesters of these dicarboxylic acids and monovalent alcohols, addition products of various types of unsaturated carboxylic acids in the manner of addition products of the aforementioned polymerizable unsaturated carboxylic acid hydroxy alkyl esters and anhydrides of polycarboxylic acids such as maleic acid, succinic acid, phthalic acid, hexahydrophthalic acid, tetrahydrophthalic acid, benzene tricarboxylic acid, benzene tetracarboxylic acid, "HIMIC Acid", tetrachlorophthalic acid or dodecenyl succinic acid, with monoglycidyl esters or butylglycidyl ethers of monovalent carboxylic acids such as "Cardura E", coconut oil fatty acid glycidyl ester or octylic acid glycidyl ester, or monoepoxy compounds such as ethylene oxide or propylene oxide, or their addition products with ε-caprolactone or hydroxy vinyl ether; dialkylaminoalkyl(meth)acrylates such as dimethyl aminoethyl(meth)acrylate or diethylaminoethyl(meth)acrylate;

epoxy group-containing polymerizable unsaturated monomers such as epoxy group-containing polymerizable compounds obtained by addition reactions at an equimolar ratio of various polyepoxy compounds having at least two epoxy groups in one molecule thereof, such as "EPICLON 200", "EPICLON 400", "EPICLON 441", "EPICLON 850" or "EPICLON 1050" (epoxy resins marketed by DIC Corporation), or "Epicoat 828", "Epicoat 1001" or "Epicoat 1004" (epoxy resins marketed by Japan Epoxy Resins Co., Ltd.), "Araldite 6071" or "Araldite 6084" (epoxy resins marketed by Ciba-Geigy, Switzerland) or additionally "Chissonox 221" (an epoxy compound marketed by Chisso Corporation) or "Denacol EX-611" (an epoxy compound marketed by Nagase Chemicals, Ltd.), with various types of unsaturated carboxylic acids such as equimolar addition products of the aforementioned polycarboxylic acid anhydrides and hydroxyl group-containing vinyl monomers such as glycidyl meth(acrylate), (β-methyl)glycidyl(meth)acrylate, (meth)allyl glycidyl ether or polymerizable unsaturated carboxylic acids or mono-2-(meth)acryloyloxy monoethyl phthalate; isocyanate group-containing α,β-ethylenic unsaturated monomers such as 2-hydroxyethyl(meth)acrylate-hexamethylene diisocyanate equimolar addition products or monomers having an isocyanate group and vinyl group such as isocyanate ethyl(meth)acrylate;

alkoxysilyl group-containing polymerizable unsaturated monomers like silicon-based monomers such as vinyl ethoxysilane, α-methacryloxypropyl trimethoxysilane, trimethylsiloxyethyl(meth)acrylate or "KR-215, X-22-5002" (products marketed by Shin-Etsu Chemical Co., Ltd.); and carboxyl group-containing α,β-ethylenic unsaturated monomers such as addition products of α,β-ethylenic unsaturated carboxylic acids such as monoesters of dicarboxylic acids and monovalent alcohols, unsaturated mono- or dicarboxylic acids such as (meth)acrylic acid, crotonic acid, maleic acid, fumaric acid, itaconic acid or citraconic acid, or addition products of α,β-unsaturated carboxylic acid hydroxyalkyl esters such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate, 4-hydroxybutyl(meth)acrylate, 3-chloro-2-hydroxypropyl(meth)acrylate, di-2-hydroxyethyl fumarate, mono-2-hydroxyethyl-monobutyl fumarate or polyethylene glycol mono(meth)acrylate, and anhydrides of polycarboxylic acids such as maleic acid, succinic acid, phthalic acid, hexahydrophthalic acid, tetrahydrophthalic acid, benzene tricarboxylic acid, benzene tetracarboxylic acid, "hymic acid", tetrachlorophthalic acid or dodecenyl succinic acid.

Among these, in particular, the use of alkyl(meth)acrylates having 3 or less carbon atoms, such as methyl(meth)acrylate or ethyl(meth)acrylate is preferable. Moreover, copolymerization using a polymerizable unsaturated monomer containing at least one type of functional group such as a carboxyl group, a sulfonate group, a phosphate group, a hydroxyl group or a dimethyl amino group is preferable in order to change the surface properties of the pigment surface and to enhance interaction with a pigment dispersant or pigment-dispersing resin.

In addition, it is even more preferable that a polymer in the pigment (A) be cross-linked so that the polymer does not elute from the pigment (A) when using a-modified pigment (D). Examples of the polyfunctional polymerizable unsaturated monomers used as cross-linking components include divinyl benzene, ethylene glycol di(meth)acrylate, diethylene glycol di(meth)acrylate, triethylene glycol di(meth)acrylate, polyethylene glycol di(meth)acrylate, 1,3-butanediol di(meth)acrylate, 1,4-butanediol di(meth)acrylate, 1,6-hexanediol di(meth)acrylate, neopentyl glycol dimethacrylate, trimethylolpropane triethoxy tri(meth)acrylate, trimethylolpropane tri(meth)acrylate, pentaerythritol tri(meth)acrylate, pentaerythritol tetra(meth)acrylate, dipentaerythritol hexa(meth)acrylate and allyl methacrylate.

In addition, with respect to a polymer containing at least one type of polymerizable unsaturated monomer (C) which is soluble in a non-aqueous solvent and becomes either insoluble or poorly soluble following polymerization as an essential component, other polymerizable unsaturated monomers may be used within a range so that the polymer does not dissolve in the non-aqueous solvent. Examples of the other polymerizable unsaturated monomers include the aforementioned alkyl(meth)acrylates having an alkyl group of 4 or more carbon atoms and other polymerizable unsaturated monomers which can be used apart from the aforementioned alkyl(meth)acrylates.

The modified pigment (D) used in the present invention can be obtained by polymerizing, under the presence of the general purpose pigment (A), a non-aqueous solvent, and the resin or the fat (B) which has a polymerizable unsaturated group, and is soluble in a nonaqueous solvent, at least one type of polymerizable unsaturated monomer (C) which is soluble in the non-aqueous solvent and becomes either insoluble or poorly soluble following polymerization.

It is preferable to mix the pigment (A) with the resin or the fat (B) which has a polymerizable unsaturated group, and is soluble in a nonaqueous solvent prior to carrying out a polymerization process. Examples of the mixing methods that can be used include the use of a homogenizer, a disperser, a bead mill, a paint shaker, a kneader, a roll mill, a ball mill, an attritor or a sand mill. In the present invention, the form of the pigment used is not particularly limited and may be of any form, such as a slurry, a wet cake or a powder. In other words, in the production method of the present invention, a pigment containing water in the form of a wet cake can also be used as a pigment.

The modified pigment (D) can be obtained by mixing the pigment (A) with the resin or the fat (B) which has a polymerizable unsaturated group, and is soluble in a nonaqueous solvent, followed by further mixing the polymerizable unsaturated monomer (C) and a polymerization initiator to be described later, and carrying out a polymerization process.

During the process, although the amount of the resin or the fat (B) which has a polymerizable unsaturated group, and is soluble in a nonaqueous solvent used is appropriately optimized depending on the purpose and there are no particular limitations thereon, the amount used is usually within a range from 1 to 200 parts, preferably from 5 to 50 parts and more preferably from 5 to 30 parts relative to 100 parts of the pigment (A).

In addition, although the amount of the polymerizable unsaturated monomer (C) used is also appropriately optimized depending on the purpose and there are no particular limitations thereon, the amount used is usually within a range from 1 to 200 parts, preferably from 5 to 50 parts and more preferably from 5 to 30 parts relative to 100 parts of the pigment (A).

The amount of the aforementioned polymer (P) ultimately coated onto the pigment is preferably within a range from 2 to 400 parts, more preferably from 10 to 100 parts and even more preferably from 10 to 60 parts relative to 100 parts of the pigment (A). At that time, at least one type of the polymerizable unsaturated monomer (C) is usually used at a ratio of 10 to 400 parts, preferably 30 to 400 parts and more preferably 50 to 200 parts relative to 100 parts of the polymer (B).

Although the method for polymerizing the polymerizable unsaturated monomer (C) in the presence of the pigment (A), a non-aqueous solvent, and the resin or the fat (B) which has a polymerizable unsaturated group, and is soluble in a non-aqueous solvent, may be carried out according to a known, commonly used polymerization method, it is normally carried out in the presence of a polymerization initiator. Examples of such polymerization initiators include a radical-generating polymerization catalyst such as azobis(isobutyronitrile) (AIBN), 2,2-azobis(2-methylbutyronitrile), benzoyl peroxide, t-butyl perbenzoate, t-butyl-2-ethylhexanoate, t-butyl hydroperoxide, di-t-butyl peroxide or cumene hydroperoxide, which may be used either alone or in combination of two or more types thereof.

Since some of the polymerization initiators are difficult to dissolve in the non-aqueous solvent system, a method is preferably used in which a polymerization initiator is dissolved in the polymerizable unsaturated monomer (C) and then added to a mixture of the pigment (A) and the resin or the fat (B) which has a polymerizable unsaturated group, and is soluble in a nonaqueous solvent.

In addition, although the polymerizable unsaturated monomer (C) or the polymerizable unsaturated monomer (C) in which a polymerization initiator has been dissolved can be added dropwise in a state such that the mixture reaches the polymerization temperature, a method in which it is added to the mixture at normal temperature prior to heating and then heated and polymerized after having been adequately mixed results in better stability and is therefore preferable.

The polymerization temperature is normally within a range from 60 to 130° C. In addition, since there are cases in which the pigment (A) may undergo a change of state such as deterioration or crystal growth if the polymerization temperature is excessively high when the pigment (A) is an organic pigment, it is preferable to carry out a polymerization process at a temperature from 70 to 100° C. in such cases.

Following polymerization, the modified pigment can be obtained in the form of a powder by removing the non-aqueous solvent and the like used in the polymerization process by filtration, followed by drying and grinding. A Nutsche or filter press and the like can be used for the filtration method. In addition, drying can be carried out with a known drying apparatus such as a box dryer, a vacuum dryer, a band dryer or a spray dryer. Further, a known crushing apparatus such as a mortar, a hammer mill, a disk mill, a pin mill or a jet mill can be used for grinding.

(Offset Printing Ink)

The printing ink can be obtained by using the modified pigment (D) as a colorant. Specifically, a printing ink, such as an offset printing ink can be obtained by dispersing the modified pigment (D) as a colorant in the liquid resin vehicle.

The offset printing ink is prepared by using 3 to 40% by weight of the modified pigment (D), 45 to 97% by weight of the liquid resin vehicle, that is, the vehicle for ink, and 0 to 20% by weight of other adjuvants or an extender pigment. In addition, if necessary, well-known additives, such as a solvent for ink, a dryer, a leveling-improving agent, and a thickener can be added arbitrarily to prepare the offset printing ink.

Any well-known vehicle can be used as long as it contains essentially a liquid resin. Examples of the vehicle used in the present invention include alkyd resins which are modified or not, phenol resins which are modified or not, and petroleum resins. In addition, a mixture of a dry oil and a liquid resin, such as a mixture of a saturated alkyd resin and various drying oils, a dry oil-modified alkyd resin, a mixture of rosin and a phenol resin, such as a mixture of a phenol resin and various rosins, and/or a rosin-modified phenol resin.

In order to produce an offset printing ink in the present invention, a mixture of rosin and a phenol resin, and/or a rosin-modified phenol resin are preferable. In particular, a rosin-modified phenol resin is preferable.

In order to produce an ink, in general, a solvent such as n-paraffin, isoparaffin, aromatic, naphthen, α-olefins, or the like can simultaneously used. If necessary, a plant oil, such as linseed oil, wood oil, and soybean oil can further be used in combination.

In general, these components can be mixed such that the content of the vehicle for an ink be 20 to 50% by weight, that of the solvent, such as paraffin be 10 to 60% by weight, and that of the plant oil be 0 to 30% by weight.

EXAMPLES

The present invention will be described in detail below with reference to a series of Examples. The terms "parts" and "%" used in the following examples are based on "mass" unless stated otherwise.

Reference Example 1

Synthesis of Acrylic Resin (B-1) Containing a Polymerizable Unsaturated Group 500 parts of heptane and 470 parts of butyl acetate were placed in a four-necked flask equipped with a thermometer, a stirrer, a reflux condenser and a nitrogen gas inlet tube followed by heating to 90° C. Then, when the temperature reached 90° C., a mixture composed of 985 parts of butyl acrylate, 15 parts of methacrylic acid and 7 parts of 2,2'-azobis(2-methyl butyronitrile) was dropwise added thereto over 5 hours. After that, the reaction was continued for 10 hours following completion of the dropwise addition while maintaining the same temperature. After lowering the temperature of the reaction liquid to 50° C., a solution containing 0.2 parts of t-butylpyrocatechol dissolved in 15 parts of butyl acetate was added followed by the addition of 15 parts of glycidyl methacrylate and 30 parts of dimethyl aminoethanol. Then, the mixture was heated to 80° C., and the reaction was further carried out for 10 hours at the same temperature to obtain a solution of the polymer (B-1) containing a polymerizable unsaturated group soluble in a non-aqueous solvent.

Reference Example 2

Synthesis of Acryl-Modified Alkyd Resin (B-3)

400 parts of heptane and 328.4 parts of butyl acetate were placed in a four-necked flask equipped with a thermometer, a stirrer, a reflux condenser and a nitrogen gas inlet tube followed by heating to 90° C. Then, when the temperature reached 90° C., a reaction mixture containing 300 parts of butyl acrylate, 250 parts of isostearyl methacrylate, 671.6 parts of Beckosol P-470-67B (soybean oil-based alkyd resin containing 67% of a non-volatile component, marketed by DIC Corporation), 10 parts of 2,2'-azobis(2-methyl butyronitrile), and 50 parts of butyl acetate was dropwise added thereto over 5 hours. The reaction was further continued for 10 hours following completion of the dropwise addition while maintaining the same temperature. Thereby, 50% solution of the acryl-modified alkyd resin (B-3) was obtained.

Reference Example 3

Synthesis of Rosin-Modified Phenol Resin Solution (B-4)

100 parts of xylene was placed in a four-necked flask equipped with a thermometer, a stirrer, a reflux condenser and a nitrogen gas inlet tube followed by heating to 120° C. Then, while maintaining the same temperature, 100 parts of Beckasite F-7302 (rosin-modified phenol resin, marketed by DIC Corporation) was added little by little in the flask, and dissolved. Thereby 50% solution of the rosin-modified phenol resin (B-4) was obtained.

Reference Example 4

Synthesis of Modified Pigment (D-1)

222 parts of the wet cake (pigment content: 45%) of Fastogen Blue TGR (blue pigment, marketed by DIC Corporation.), 10 parts of the polymer (B-1) obtained in the Reference Example 1, 600 parts of 1.25 mm zirconia beads and 300 parts of heptane were placed in a polyethylene wide-mouthed bottle followed by mixing for 60 minutes with a paint shaker (marketed by Toyo Seiki Co., Ltd.). After diluting the resultant with 300 parts of heptane, the zirconia beads were removed to prepare a pigment mixed liquid.

After placing 400 parts of the resulting pigment mixed liquid in a separable flask equipped with a thermometer, a stirrer, a reflux condenser and a nitrogen gas inlet tube. Then, a solution of 1 part of 2,2'-azobis(2-methyl butyronitrile) dissolved in a polymerizable monomer composition consisting of 3.1 parts of styrene and 1.7 parts of ethylene glycol dimethacrylate serving as the polymerizable monomer (C) and 200 parts of heptane were added to the mixed liquid. After 30 minutes of continuous stirring at room temperature, the temperature of the mixture was raised to 80° C. and the reaction was continued for 15 hours at the same temperature. After cooling, filtration was carried out to separate the modified pigment and the polymerization solvent. The resulting modified pigment was dried for 5 hours at 100° C. with a hot air dryer followed by grinding with a grinder to yield a modified pigment (D-1).

Reference Examples 5 to 12

Synthesis of Modified Pigments (D-2) to (D-9)

A pigment mixed liquid was obtained in a manner identical to that of Reference Example 4 with the exception that the used pigment (A), resin or fat (B), nonaqueous solvent used in dispersing, and nonaqueous solvent used to separate after dispersion were changed to those shown in Tables 1 and 2.

The modified pigments (D-2) to (D-9) were obtained using 400 parts of the obtained pigment mixed liquid in a manner identical to that of Reference Example 4 with the exception that the used copolymerizable monomer (C) was changed to those shown in Tables 1 and 2.

TABLE 1

|  |  | Reference Example 4 | Reference Example 5 | Reference Example 6 | Reference Example 7 | Reference Example 8 |
|---|---|---|---|---|---|---|
| Used Modified pigment |  | (D-1) | (D-2) | (D-3) | (D-4) | (D-5) |
| Resin or Fat (B) | As (B-1): | 10 |  |  |  |  |
|  | Resin (B-1) obtained in Reference Example 1 |  |  |  |  |  |
|  | As (B-1): |  | 10 |  |  |  |
|  | AB-6 |  |  |  |  |  |
|  | As Resin (B-2): |  |  |  | 10 | 10 |
|  | Beckosol P-470-67B |  |  |  |  |  |

TABLE 1-continued

|  |  | Reference Example 4 | Reference Example 5 | Reference Example 6 | Reference Example 7 | Reference Example 8 |
|---|---|---|---|---|---|---|
|  | As (B-3): Resin (B-3) obtained in Reference Example 2 |  |  |  |  | 10 |
|  | As (B-4): Resin (B-4) obtained in Reference Example 3 |  |  |  |  |  |
|  | As (B-4): Soybean oil |  |  |  |  |  |
| Nonaqueous solvent used in dispersion | Heptane | 300 | 300 | 300 | 300 | 300 |
| Pigment (A) | Fastogen Blue TGR (wet cake) B-15:3 | 222 | 222 | 222 |  |  |
|  | Symuler Brilliant Carmine 6B300(wet cake) R-57:1 |  |  |  | 250 | 250 |
|  | Fastogen Green S (powder) G-7 |  |  |  |  |  |
| 1.25 mm zirconia beads |  | 600 | 600 | 600 | 600 | 600 |
| Nonaqueous solvent used in separation | Heptane | 300 | 300 | 300 | 300 | 300 |
| Polymerizable monomer (C) | Methyl methacrylate |  |  |  |  |  |
|  | Styrene | 3.1 | 1.4 | 3.1 | 2.8 | 2.1 |
|  | Divinyl benzene (mixed isomer) |  | 3.4 |  | 1.9 | 4.9 |
|  | EGDMA | 1.7 |  | 1.7 |  |  |
| Solvent added in polymerization | Heptane | 150 | 170 | 140 | 200 | 160 |
| Polymerization initiator | Polymerization initiator 1 | 1.0 | 1.0 | 1.0 | 0.9 | 1.4 |
|  | Polymerization initiator 2 |  |  |  |  |  |

TABLE 2

|  |  | Reference Example 9 | Reference Example 10 | Reference Example 11 | Reference Example 12 |
|---|---|---|---|---|---|
| Used Modified pigment |  | (D-6) | (D-7) | (D-8) | (D-9) |
| Resin or Fat (B) | As (B-1): Resin (B-1) obtained in Reference Example 1 |  |  |  |  |
|  | As (B-1): AB-6 |  |  | 10 |  |
|  | As Resin (B-2): Beckosol P-470-67B |  |  |  | 10 |
|  | As (B-3): Resin (B-3) obtained in Reference Example 2 |  |  |  |  |
|  | As (B-4): Resin (B-4) obtained in Reference Example 3 | 10 |  |  |  |
|  | As (B-5): Soybean oil |  | 10 |  |  |
| Nonaqueous solvent used in dispersion | Heptane | 300 | 300 | 300 | 300 |
| Pigment (A) | Fastogen Blue TGR (wet cake) B-15:3 |  |  |  |  |
|  | Symuler Brilliant Carmine 6B300(wet cake) R-57:1 | 250 | 250 |  |  |
|  | Fastogen Green S (powder) G-7 |  |  | 100 | 100 |
| 1.25 mm zirconia beads |  | 600 | 600 | 600 | 600 |
| Nonaqueous solvent used in separation | Heptane | 300 | 300 | 400 | 400 |
| Polymerizable monomer (C) | Methyl methacrylate | 1.9 | 4.2 |  |  |
|  | Styrene | 3.0 |  | 5.2 | 1.5 |
|  | Divinyl benzene (mixed isomer) |  |  |  | 3.5 |
|  | EGDMA | 2.1 | 2.8 | 2.2 |  |
| Solvent added in polymerization | Heptane | 120 | 150 | 180 | 185 |
| Polymerization initiator | Polymerization initiator 1 | 1.4 |  | 1.5 | 1.0 |
|  | Polymerization initiator 2 |  | 1.4 |  |  |

In Tables 1 and 2:

"AB-6" indicates a polybutyl acrylate macromonomer, marketed by Toagosei Co., Ltd.;

"Beckosol P-470-67B" indicates soybean oil-based alkyd resin containing 67% of non-volatile component, marketed by DIC Corporation;

"Fastogen Blue TGR (wet cake) C.I. Pigment Blue 15:3" indicates a blue pigment containing 45% of a pigment component, marketed by DIC Corporation;

"Symuler Brilliant Carmine 6B300 (wet cake) C. I. Pigment Red 57:1" indicates a red pigment containing 40.0% of a pigment component, marketed by DIC Corporation;

"Fastogen Green S (powder) C. I. Pigment Green 7" indicates a green pigment, marketed by DIC Corporation;

"Divinyl benzene" indicates the polymerizable monomer containing 55% of divinyl benzene and 45% of ethyl vinyl benzene (structural isomer);

"EGDMA" indicates ethylene glycol dimethacrylate;

"Polymerization initiator 1" indicates 2,2'-azobis(2-methylbutyronitrile); and

"Polymerization initiator 2" indicates t-butylperoxy-2-ethylhexanoate.

Reference Example 13

Production of Vehicle 350 parts of soybean oil was placed in a four-necked flask equipped with a thermometer, a stirrer, a reflux condenser and a nitrogen gas inlet tube followed, and 420 parts of Becksite F-7302 (rosin-modified phenol resin, marketed by DIC Corporation) was added little by little, then the temperature was increased to 200° C., and the solution was heated to dissolve for 1 hour. After cooling, 230 parts of AF solvent No. 6 was added and mixed uniformly to obtain a rosin-modified phenol resin solution.

Example 1

18 parts of the modified pigment (D-1) obtained in Reference Example 4, 67 parts of the rosin-modified phenol resin solution obtained in Reference Example 13, 15 part of AF Solvent No. 6 (marketed by Nippon Oil Corporation), and 1 part of a dryer (a mixture of manganese naphthenate and cobalt octylate; marketed by DIC Corporation) were pre-mixed using a high speed mixer (turbine type mixing wing) at 3000 rotations for 10 minutes. The ink composition obtained by the pre-mix was subjected to roll pass using a three-rollers until the milling degree measured by a grind meter was 4 microns or less. The offset printing ink was obtained by 2 passes.

The obtained offset printing ink was transferred to an art paper using a basic color transfer (RI Tester, marketed by Hoei Seiko Co., Ltd.). The density (OD value) was measured by SpectroEye (marketed by Gretag Macbeth). The 60° gloss was measured by Haze Glossmeter, marketed by BYK Gardner GmbH.

Examples 2 to 9

An offset printing ink was obtained in a manner identical to that of Example 1 with the exception that the used modified pigment was changed to those shown in Tables 3 through 5. Then, the offset printing ink was transferred to evaluate. The results are shown in Tables 3 through 5.

Comparative Examples 1 to 3

An offset printing ink was obtained in a manner identical to that of Example 1 with the exception that the used modified pigment was changed to those shown in Table 5. Then, the offset printing ink was transferred to evaluate. The results are shown in Table 5.

TABLE 3

| | | Example 1 | Example 2 | Example 3 | Example |
|---|---|---|---|---|---|
| Ink composition | Modified pigment | (D-1) | (D-2) | (D-3) | (D-4) |
| | Lower value: content by parts TGR | 18 | 18 | 18 | 18 |
| | Carmine 6B | | | | |
| | Green S | | | | |
| | Rosin-modified resin solution in Reference Example 13 | 67 | 67 | 67 | 67 |
| | AF Soluvent Number 6 | 15 | 15 | 15 | 15 |
| | Drayer | 1 | 1 | 1 | 1 |
| Pigment dispersibility (GM, μm) | Pre-mixing | >10 | 8 | >10 | >10 |
| | Roll 1 pass | 6 | 3 | 4 | 3 |
| | Roll 2 pass | 4 | — | — | — |
| | Roll 3 pass | — | — | — | — |
| | Roll 4 pass | — | — | — | — |
| Gloss (60°) | | 81 | 79 | 80 | 82 |
| OD value (Ciane) | | 2.1 | 2.0 | 2.2 | — |
| OD value (Mazenda) | | — | — | — | 2.3 |

TABLE 4

| | | Example 5 | Example 6 | Example 7 | Example 8 |
|---|---|---|---|---|---|
| Ink composition | Modified pigment | (D-5) | (D-6) | (D-7) | (D-8) |
| | Lower value: content by parts TGR | 18 | 18 | 18 | 18 |
| | Carmine 6B | | | | |
| | Green S | | | | |
| | Rosin-modified resin solution in Reference Example 13 | 67 | 67 | 67 | 67 |
| | AF Soluvent Number 6 | 15 | 15 | 15 | 15 |
| | Drayer | 1 | 1 | 1 | 1 |
| Pigment dispersibility (GM, μm) | Pre-mixing | >10 | 8 | >10 | 3 |
| | Roll 1 pass | 6 | 3 | 4 | No grain |
| | Roll 2 pass | 4 | — | — | — |
| | Roll 3 pass | — | — | — | — |
| | Roll 4 pass | — | — | — | — |

TABLE 4-continued

|  | Example 5 | Example 6 | Example 7 | Example 8 |
|---|---|---|---|---|
| Gloss (60°) | 76 | 79 | 80 | 82 |
| OD value (Ciane) | — | — | — | — |
| OD value (Mazenda) | 2.2 | 2.1 | 2.0 | — |

TABLE 5

|  |  | Example 9 | Com. Example 1 | Com. Example 2 | Com. Example 3 |
|---|---|---|---|---|---|
| Ink composition | Modified pigment Lower value: content by parts | (D-1) 18 | | | |
| | TGR | | 18 | | |
| | Carmine 6B | | | 18 | |
| | Green S | | | | 18 |
| | Rosin-modified resin solution in Reference Example 13 | 67 | 67 | 67 | 67 |
| | AF Soluvent Number 6 | 15 | 15 | 15 | 15 |
| | Drayer | 1 | 1 | 1 | 1 |
| Pigment dispersibility (GM, μm) | Pre-mixing | 4 | >10 | >10 | >10 |
| | Roll 1 pass | No grain | >10 | >10 | >10 |
| | Roll 2 pass | — | 8 | 8 | 9 |
| | Roll 3 pass | — | 4 | 6 | 7 |
| | Roll 4 pass | — | — | 4 | 5 |
| Gloss (60°) | | 76 | 79 | 76 | 60 |
| OD value (Ciane) | | — | 1.9 | — | — |
| OD value (Mazenda) | | — | — | 2.1 | — |

In Tables 3 through 5:

"TGR" indicates "Fastogen Blue TGR (powder) C.I. Pigment Blue 15:3" which is a blue pigment, marketed by DIC Corporation;

"Carmine 6B" indicates "Symuler Brilliant Carmine 6B300 (powder), C. I. Pigment Red 57:1", which is a red pigment, marketed by DIC Corporation; and "Green S" indicates "Fastogen Green S (powder) C. I. Pigment Green 7", which is a green pigment, marketed by DIC Corporation.

It is confirmed that Examples 1 to 9 using the modified pigment (D) could obtain an ink having a milling degree of 4 microns or less by only 2 passes or less, and the obtained ink had excellent pigment dispersibility. In contrast, 3 passes or more was needed to obtain an ink in all Comparative Examples.

INDUSTRIAL APPLICABILITY

The offset printing ink according to the present invention can be easily obtained by less number of roll passing within reduced time for dispersing a pigment. The offset printing ink has excellent ability in gloss and color development. The offset printing ink is useful for an offset printing ink.

The invention claimed is:

1. An offset printing ink in which a modified pigment (D) is dispersed in a vehicle as a colorant, the modified pigment (D) has a polymer (P) on the surface thereof, and the modified pigment (D) is obtained by mixing a pigment (A); at least one of a resin or fat (B) having a polymerizable unsaturated group, said resin or fat (B) is selected from the group consisting of acrylic resins having a polymerizable unsaturated group, alkyd resins, natural resin-modified phenol resins, and fats; and nonaqueous solvent; and adding, mixing, and polymerizing with at least one polymerizable unsaturated monomer (C) on the surface of the pigment (A); and wherein the polymerizable unsaturated monomer (C) contains a polyfunctional polymerizable monomer.

2. An offset printing ink according to claim 1, wherein the polymerizable unsaturated group is a radical polymerizable unsaturated group or an oxidation polymerizable unsaturated group.

3. An offset printing ink according to claim 1, wherein the at least one of a resin or fat (B) having a polymerizable unsaturated group is an acrylic resin or an alkyd resin which has a polymerizable unsaturated group.

4. An offset printing ink according to claim 1, wherein the acrylic resin having a polymerizable unsaturated group is a polymer obtained by introducing a polymerizable unsaturated group in a copolymer of polymerizable unsaturated monomers containing mainly alkyl(meth)acrylate having an alkyl group containing 4 or more carbon atoms, or a macromonomer containing a copolymer made of polymerizable unsaturated monomers containing mainly alkyl(meth)acrylate having an alkyl group containing 4 or more carbon atoms.

5. An offset printing ink according to claim 1, wherein the pigment (A) is an organic pigment.

6. An offset printing ink according to claim 1, wherein the nonaqueous solvent contains an aliphatic hydrocarbon-based solvent and/or an alicyclic hydrocarbon-based solvent.

7. An offset printing ink according to claim 2, wherein the at least one of a resin or fat (B) having a polymerizable unsaturated group is an acrylic resin or an alkyd resin which has a polymerizable unsaturated group.

8. An offset printing ink according to claim 2, wherein the acrylic resin having a polymerizable unsaturated group is a polymer obtained by introducing a polymerizable unsaturated group in a copolymer of polymerizable unsaturated monomers containing mainly alkyl(meth)acrylate having an alkyl group containing 4 or more carbon atoms, or a macromonomer containing a copolymer made of polymerizable unsaturated monomers containing mainly alkyl(meth)acrylate having an alkyl group containing 4 or more carbon atoms.

9. An offset printing ink according to claim 3, wherein the acrylic resin having a polymerizable unsaturated group is a polymer obtained by introducing a polymerizable unsaturated group in a copolymer of polymerizable unsaturated monomers containing mainly alkyl(meth)acrylate having an alkyl group containing 4 or more carbon atoms, or a macromonomer containing a copolymer made of polymerizable unsaturated monomers containing mainly alkyl(meth)acrylate having an alkyl group containing 4 or more carbon atoms.

10. An offset printing ink according to claim 2, wherein the pigment (A) is an organic pigment.

11. An offset printing ink according to claim 3, wherein the pigment (A) is an organic pigment.

12. An offset printing ink according to claim 4, wherein the pigment (A) is an organic pigment.

13. An offset printing ink according to claim 2, wherein the nonaqueous solvent contains an aliphatic hydrocarbon-based solvent and/or an alicyclic hydrocarbon-based solvent.

14. An offset printing ink according to claim 3, wherein the nonaqueous solvent contains an aliphatic hydrocarbon-based solvent and/or an alicyclic hydrocarbon-based solvent.

15. An offset printing ink according to claim 4, wherein the nonaqueous solvent contains an aliphatic hydrocarbon-based solvent and/or an alicyclic hydrocarbon-based solvent.

* * * * *